United States Patent
Missotten

(10) Patent No.: US 10,172,290 B2
(45) Date of Patent: Jan. 8, 2019

(54) AGRICULTURAL HARVESTER UNLOADING VIA HEADER STRUCTURE

(71) Applicant: CNH Industrial America LLC, New Holland, PA (US)

(72) Inventor: Bart M. A. Missotten, Herent (BE)

(73) Assignee: CNH Industrial America LLC, New Holland, PA (US)

( * ) Notice: Subject to any disclaimer, the term of this patent is extended or adjusted under 35 U.S.C. 154(b) by 1 day.

(21) Appl. No.: 14/911,672

(22) PCT Filed: Aug. 13, 2014

(86) PCT No.: PCT/EP2014/067285
§ 371 (c)(1),
(2) Date: Feb. 11, 2016

(87) PCT Pub. No.: WO2015/022343
PCT Pub. Date: Feb. 19, 2015

(65) Prior Publication Data
US 2016/0183470 A1 Jun. 30, 2016

(30) Foreign Application Priority Data
Aug. 13, 2013 (BE) .................................. 2013/0540

(51) Int. Cl.
*A01D 90/10* (2006.01)
*A01D 41/12* (2006.01)
(Continued)

(52) U.S. Cl.
CPC ......... *A01D 90/10* (2013.01); *A01D 41/1217* (2013.01); *A01D 61/002* (2013.01); *A01D 75/182* (2013.01); *A01D 2101/00* (2013.01)

(58) Field of Classification Search
CPC ...... A01D 90/10; A01D 43/00; A01D 43/086; A01D 43/087; A01D 43/06; A01D 43/063;
(Continued)

(56) References Cited

U.S. PATENT DOCUMENTS

| 4,838,012 A * | 6/1989 | Bowen, III | A01D 45/00 |
|---|---|---|---|
| | | | 56/12.8 |
| 8,074,434 B2 * | 12/2011 | Taylor | A01D 19/04 |
| | | | 171/129 |

(Continued)

FOREIGN PATENT DOCUMENTS

| DE | 202008004945 U1 | 7/2008 |
|---|---|---|
| EP | 2022314 A2 | 2/2009 |
| NL | 7210485 A | 1/1974 |

*Primary Examiner* — Saul Rodriguez
*Assistant Examiner* — Ashley K Romano
(74) *Attorney, Agent, or Firm* — Peter K. Zacharias; Patrick M. Sheldrake

(57) ABSTRACT

An agricultural harvester has a header for harvesting a crop, an on-board container for storing the harvested crop, and a feeder adapted to receive the harvested crop from the header and provide the harvested crop to the on-board container. The agricultural harvester further has a transporter adapted to transport the harvested crop from the on-board container towards a distal end of the header; at least part of the transporter being mounted to the header or the feeder and a discharger in communication with the transporter and adapted to receive the harvester crop as transported by the transporter, at or near the distal end of the header, the discharger having a discharge outlet for discharging the harvested crop.

15 Claims, 6 Drawing Sheets

(51) Int. Cl.
*A01D 61/00* (2006.01)
*A01D 75/18* (2006.01)
*A01D 101/00* (2006.01)

(58) Field of Classification Search
CPC ............... A01D 43/0635; A01D 57/20; A01D 41/1217; A01D 61/002; A01D 75/182; A01D 2101/00
See application file for complete search history.

(56) References Cited

U.S. PATENT DOCUMENTS

| | | | | |
|---|---|---|---|---|
| 2009/0019826 | A1* | 1/2009 | Rigney | A01D 41/00 56/13.5 |
| 2009/0205307 | A1* | 8/2009 | Warren | A01D 43/087 56/153 |
| 2012/0263560 | A1* | 10/2012 | Diekhans | A01D 43/087 414/294 |

* cited by examiner

PRIOR ART

AGRICULTURAL HARVESTER UNLOADING VIA HEADER STRUCTURE

This application is the US National Stage filing of International Application Serial No. PCT/EP2014/067285 filed on Aug. 13, 2014 which claims priority to Belgian Application BE2013/0540 filed Aug. 13, 2013, each of which is incorporated herein by reference in its entirety.

FIELD OF THE INVENTION

The invention relates to the field of agricultural harvesters such as combine harvesters, and more specifically to the unloading of such harvesters.

BACKGROUND OF THE INVENTION

The present invention relates to the field of agricultural harvesters, as e.g. applied for the harvesting of a crop such as grain or corn. Typically, such a harvester is equipped with a header or header structure for cutting the crop and providing the cut or harvested crop, e.g. via a feeder or feeding structure to an on-board storage tank or container. Typically, the header or header structure has an elongated structure that may span up to 50 or 70 feet and comprises a cutting member such as a cutter bar for cutting the crop and a screw conveyer, also referred to as a cross auger, for conveying the cut crop towards the feeding structure. Typically, the cut crop may be processed prior to being gathered in the on-board tank or container. The harvesting of a crop by the agricultural harvester is typically performed as a continuous process. In order to realize this, the on-board tank or container is periodically emptied or unloaded. Typically, this is done using a discharge tube that is mounted to the on-board tank and which extends, during the unloading process, parallel to the header structure such that the harvested crop can be discharged to a container on a truck or a trailer that rides along with the agricultural harvester. Note that in general, the truck that rides along with the agricultural harvester, is preferably not positioned behind the header structure, but should be positioned beyond the width of the header structure.

Due to an ever increasing width of the applied header structures of agricultural harvesters, the discharging or unloading of the on-board tank or container becomes more and more difficult. The weight of the discharge tube (including the weight of the crop that is being unloaded) increases, in order to maintain the structural integrity of the tube. Due to the weight and the large extension of the weight beyond the central axis of the harvester, there is a high load on one side of the harvester that may result in a side tilt of the harvester which may cause extensive forces on the harvester frame and on-board tank upper structure. The increasing weight of the discharge tube also adds to the overall weight of the agricultural harvester and may thus affect the impact on the soil, in particular provide in an increased pressure on the soil.

SUMMARY OF THE INVENTION

It would be desirable to provide an alternative way of unloading harvested crop from an agricultural harvester in order to avoid or at least mitigate the disadvantages mentioned.

To address this concern, there is provided in an aspect of the present invention, an agricultural harvester comprising:
a header for harvesting a crop;
an on-board container for storing the harvested crop;
a feeder adapted to receive the harvested crop from the header and to provide the harvested crop to the on-board container,
wherein the agricultural harvester further comprises:
a transporter adapted to transport the harvested crop from the on-board container towards a distal end of the header; at least part of the transporter being mounted to the header and/or the feeder and
a discharger in communication with the transporter and adapted to receive the harvested crop as transported by the transporter, the discharger being arranged at or near the distal end of the header, the discharger comprising a discharge outlet for discharging the harvested crop.

In accordance with the present invention, an agricultural harvester is provided that enables an alternative unloading of the harvested crop from the on-board tank, compared to a conventional discharging whereby a comparatively long discharge tube is used, the discharge tube being mounted to an on-board tank of the agricultural harvester and extending as far as the width of the header.

Due to the increasing width of the headers as applied in agricultural harvesters, such a discharge tube has become costly and heavy. In addition, the discharge tube takes a lot of space rendering the transport difficult, when the agricultural harvester has to go on the road, due to the discharge tube sticking out.

In accordance with the present invention, the harvested crop is unloaded using a transporter/discharger combination, in which the transporter/discharger combination makes use of the already present feeder and/or header. In the present invention, a transporter is used to transport the harvested crop from the on-board container towards a distal end of the header, at least part of the transporter being mounted to either the header or the feeder. As an example, the transporter comprises a first transport device for transporting the harvested crop from the on-board tank towards the front of the harvester and a second transport device for receiving the harvested crop from the first transport device and transporting the harvested crop, in a substantially transversal direction towards the discharger.

Optionally, the first transport device comprises an auger, a conveyer belt, compressed air means, an elevator or a combination thereof.

Optionally, the second transport device comprises an auger, a conveyer belt, compressed air means, an elevator or a combination thereof.

In accordance with the present invention, the harvested crop that is transported by the transporter towards a distal end of the header is subsequently received by a discharger that is adapted to discharge the harvested crop via an outlet of the discharger. As an example, the discharger may comprise an auger or conveyer belt for transporting the harvested crop from the distal end of the header to a discharge outlet of the discharger. During use, the discharge outlet of the discharger can be provided in such a position that the harvested crop that is discharged via the discharge outlet can be received by a truck or trailer that rides along side of the agricultural harvester. The discharger may e.g. be mounted to the header, e.g. at or near a distal end of the header.

In the present invention, the harvested crop is thus brought towards an end of the header where it is picked up by a discharger. Compared to the conventional approach, a much lighter discharger or discharge structure can be applied. Further, compared to the conventional discharging, the unloading as provided by the present invention may result in less damage to the harvested crop, due to a more 'gentle' conveying. In this respect, it can be noted that, in order to discharge the harvested crop in the conventional manner, a substantially vertically positioned auger is typically applied to transport the harvested crop upwards, towards the discharging tube. Such an arrangement has a comparatively high power demand and exerts an important strain on the harvested crop. In the present invention, the harvested crop is transported towards a distal end of the header, e.g. using a conveyer belt. Such transport is found to be less power consuming compared to the conventional approach where typically a vertically oriented auger is used, and enables a more rapid and smooth transport of the harvested crop.

Further, it is worth mentioning that the unloading procedure as can be performed using an agricultural harvester according to the invention can be more easily observed and checked by the operator of the agricultural harvester, since the unloading is substantially performed via the front side of the harvester.

In an embodiment, the discharger of the agricultural harvester comprises a discharge tube that is pivotally mounted at or near the distal end of the header. This enables the overall width of the transporter/discharger combination to be reduced during transport or when no discharging is performed. Such discharger can, in an embodiment, be mounted to the transporter or the header.

In an embodiment, an actuator such as an electric, hydraulic or pneumatic actuator is provided for pivoting the discharge tube.

In an embodiment, the transporter, or a part thereof, can be mounted to the header of the agricultural harvester.

In another embodiment, the transporter can comprise a support structure which is adapted to structurally support the header during field operation or road transportation. In order to support the header, the support structure can, in an embodiment, be provided with one or more connecting devices to enable a releasable connection between the support structure and the header. Optionally, such a support structure may have an elongated shape spanning a width that substantially corresponds to the width of the header. In an embodiment, the support structure can be provided with wheels which can replace the function of wheels that are typically provided underneath the header.

In such embodiment, the support structure may further be equipped with a height adjustment mechanism enabling an adjustment of the vertical position of the header during use. Such height adjustable mechanism may e.g. include one or more height adjustable wheels.

In an embodiment, the transporter/discharger combination is configured substantially symmetrically towards both distal ends of the header. In such embodiment, an unloading of the on-board tank can be performed from both sides of the agricultural harvester.

In another aspect of the present invention, there is provided an unloading system for an agricultural harvester, the system comprising:
 a transporter for receiving a harvested crop from an on-board tank of the agricultural harvester, the transporter comprising:
  a support structure having a width substantially matching a width of a header of the agricultural harvester,
  a transport device, mounted to the support structure, for transporting the harvested crop towards a distal end of the support structure;
  a discharger in communication with the transport device of the transporter and adapted to receive the harvested crop as transported by the transport device, at or near the distal end of the support structure, the discharger comprising a discharge outlet for discharging the harvested crop, and wherein
 the support structure is adapted to be connected to a feeder and/or header of the agricultural harvester, thereby supporting the header of the agricultural harvester.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1A:
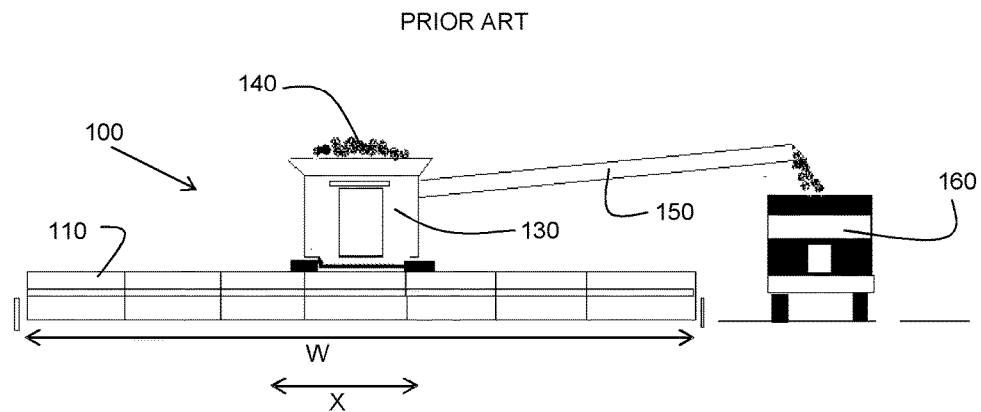
FIGS. 1a and 1b schematically depict a front and a top view of an agricultural harvester as known in the art.
Figure 1B:
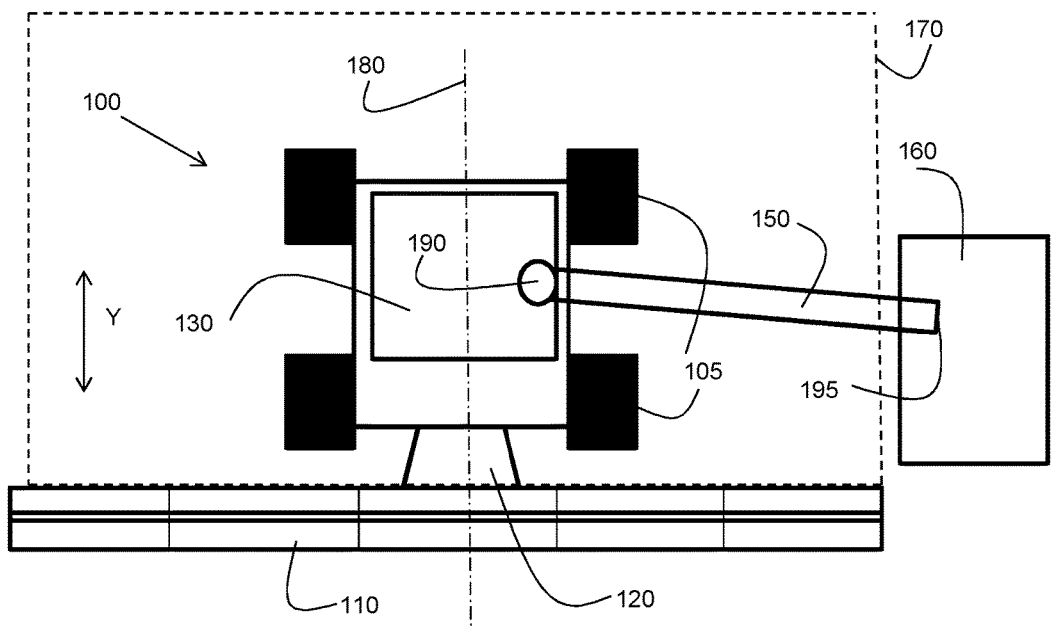

FIGS. 1a and 1b schematically depict a front view and a top view of an agricultural harvester as known in the art.

As schematically shown in FIGS. 1a and 1b, the agricultural harvester 100 as known in the art comprises a header 110 extending in a transverse direction (indicated as the x-direction), arranged to harvest the crop such as corn or grain and supply the harvested crop via a so-called feeder 120 to an on-board tank 130 of the harvester 100. The harvester 100 as shown further comprises a set of wheels 105. During operation, the harvester moves in the longitudinal direction (indicated as the Y-direction), whereby the harvested crop 140 is gathered in the on-board tank 130. For efficiency purposes, the on board tank 130 is emptied or unloaded at regular instances 'on the go', such that the harvesting process need not be interrupted. In known harvesters, use is made of a discharge tube 150 for such on the go discharging of the on-board tank into a truck or trailer 150 that rides along side of the harvester 100.

During the unloading of the on-board tank 130, the trailer or truck 160 is typically positioned outside an area covered by the header 110 during operating, this area schematically being indicated by the dotted line 170. Due to e.g. a discharging of the residue of the harvested crop, which typically takes place inside the area 170, or the generation of dust behind the harvester, the area 170 is not well suited for the positioning of the trailer or truck 160 during the unloading.

It can further be observed that there is an increasing need or drive towards the use of headers 110 having an increased width W, i.e. in the transverse X-direction. As a consequence of this, and taking account of the limitations regarding the positioning of the truck or trailer, the discharge tube 150 as used in known harvesters needs to become longer as well, in order to extend beyond the width W of the header. However, in order to realize this, the discharge tube 150 tends to become large and heavy, in order to maintain the structural integrity of the tube during discharging. Due to the increased weight of the tube (and the harvested crop that is inside the tube during discharging) and the increased outward position of the weight, relative to a central axis 180 of the harvester, an important torque may be exerted on the agricultural harvester 100 that needs to be counteracted to keep the agricultural harvester, in particular the header 110, flush or parallel with the soil. The increasing weight of the discharge tube also adds to the overall weight of the agricultural harvester and may thus affect the impact on the soil, in particular provide in an increased pressure on the soil and instability on side sloped operation. In addition, the power requirements for discharging the harvested crop may increase due to the increased length of the discharge tube.

Typically, in order to discharge the harvested crop in the manner as known in the art, a vertically oriented auger 190 is used to transport the harvested crop from the bottom of the on-board tank to an elevated position where the harvested crop is e.g. received by a conveyer belt or auger that is mounted inside the discharge tube 150 for transporting the harvested crop towards an outlet 195 of the discharge tube.

Due to the use of a wider header, the discharging needs to be performed more often and faster. In order to realize this, a larger diameter of the auger 190 and the discharge tube 150 may be required, again adding to weight and costs and taking up, in case of the auger 190, valuable space inside the on-board tank.

In accordance with the present invention, an alternative way of discharging or unloading harvested crop from the on-board tank of an agricultural harvester is proposed, whereby the harvested crop is discharged via a different route, compared to the conventional approach.

Figure 2:
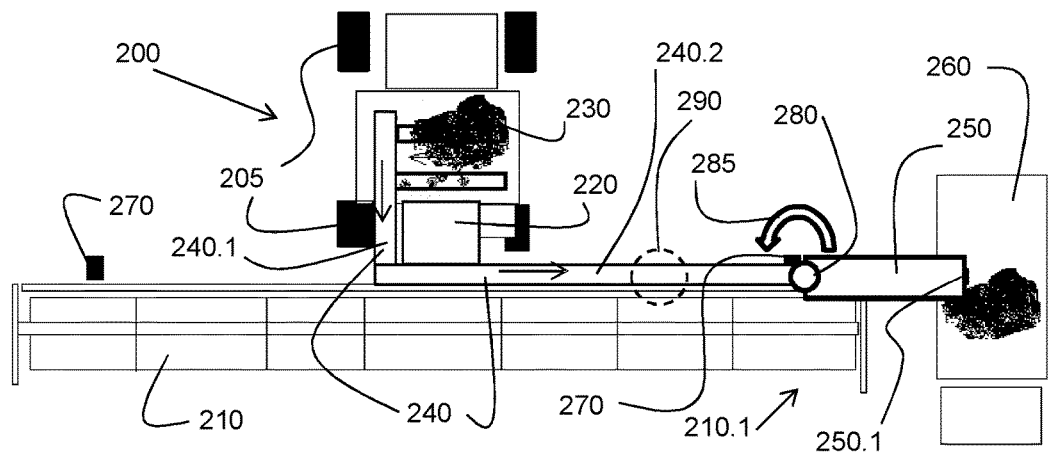
FIG. 2 schematically depicts a top view of an agricultural harvester according to a first embodiment of the present invention.

In FIG. 2, a top view of a first embodiment of an agricultural harvester according to the present invention is schematically shown.

In the embodiment as shown, the agricultural harvester 200 according to the present invention comprises a header 210 for harvesting a crop and supply the harvested crop via a so-called feeder 220 to an on-board tank 230 of the harvester. In order to discharge or unload the harvested crop from the on-board tank 230, the agricultural harvester 200 according to the present invention comprises a transporter 240 which is adapted to transport the harvested crop from the on-board container towards a distal end 210.1 of the header 210; at least part of the transporter being connected to the header 210 and/or the feeder 220. In FIG. 2, arrows 260 indicate the transport direction of the harvested crop from the on-board container 230 towards the distal end 210.1. In accordance with the present invention, distal ends of the header indicate the extremities/outer parts of the header 210 in the transverse direction.

The agricultural harvester 200 according to the present invention further comprises a discharger 250 in communication with the transporter and adapted to receive the harvester crop as transported by the transporter 240, at or near the distal end of the header, the discharger 250 comprising a discharge outlet 250.1 for discharging the harvested crop, e.g. onto a truck or trailer 260.

In an embodiment, the transporter 240 can comprise one or more augers, conveyers or the like for transporting the harvested crop towards the distal end 210.1 of the header 210. At or near the distal end, the transported crop is received by a discharger 250 which can e.g. comprise a discharge tube provided with an auger or conveyer. Compared to the discharge tube 150 as applied in the known agricultural harvester, the discharger 250 as applied in the present invention can be kept comparatively small and light, due to the fact that the harvested crop is brought towards a end of the header 210 by the transporter 240.

In accordance with the present invention, at least part of the transporter 240 is mounted to the header 210 and/or feeder 220 of the harvester 200. As such, use is made of an already present structure to support at least part of the transporter, enabling the application of a comparatively light structure for the transporter, compared to the discharge tube 150 as applied in the known arrangements.

Further, it is worth noting that, in an embodiment of the present invention, the transport of the harvested crop by the transporter 240 from the on-board container 230 towards the distal end of the header may occur in a substantially horizontal plane. In accordance with the present invention, a substantially horizontal plane is considered to have a slope that is less than 25° relative to the horizontal plane. Compared to the conventional approach, whereby a vertical oriented auger (such as auger 190 as shown in FIG. 1) is applied, the proposed way of transporting the harvested crop has lower power requirements and is more gentle for the crop (less grain damage).

In the embodiment as shown, the transporter 240 comprises a first transport device 240.1 adapted to transport the harvested crop from the on-board tank towards a front of the harvester and a second transport device 240.2, adapted to receive the harvested crop from the first transport device and transport the harvested crop substantially transversally towards the discharger 250. In such arrangement, the second transport device 240.2 and the discharger 250 may e.g. be mounted to the header 210.

In an embodiment, the transport devices 240.1 and 240.2 may e.g. comprise an auger or conveyer belt, which can be arranged in a substantially horizontal position. Although such an arrangement provides in an advantage over the use of a substantially vertical oriented auger and a discharge tube as used in the prior art, it should not be excluded from the present invention that, instead of the first transport device 240.1, the harvested crop can be brought to the front of the harvester, in particular to the second transport device 240.2 by using a vertical auger (such as the auger 190 of FIG. 1b) and a discharge tube. Note that, in such arrangement, the discharge tube as applied need not be as long as the discharge tube of FIG. 1, rather, a comparatively short discharge tube can be used, the tube being adapted to supply the harvested crop to the second transport device 240.2, e.g. at a collection position indicated by the dotted line 290, whereupon the harvested crop is transported by the second transport device 240.2 towards the discharger 250. Note that in such an arrangement, the first transport device 240.1 as shown can be omitted while the second transport device 240.2 can be kept shorter, e.g. extending from the collection position 290 to the discharger.

In FIG. 2, the header 210 is further provided with header wheels 270 for supporting the header.

In an embodiment, the discharger 250 is pivotally mounted (e.g. to the header) such that it can be folded inwardly, thereby reducing the overall with of the transporter/discharger combination.

In FIG. 2, such a pivoting about a substantially vertical axis is schematically shown, whereby reference number 280 is used to denote the pivot axis and arrow 285 indicates the pivot angle about which the discharger is rotated.

Figure 3:
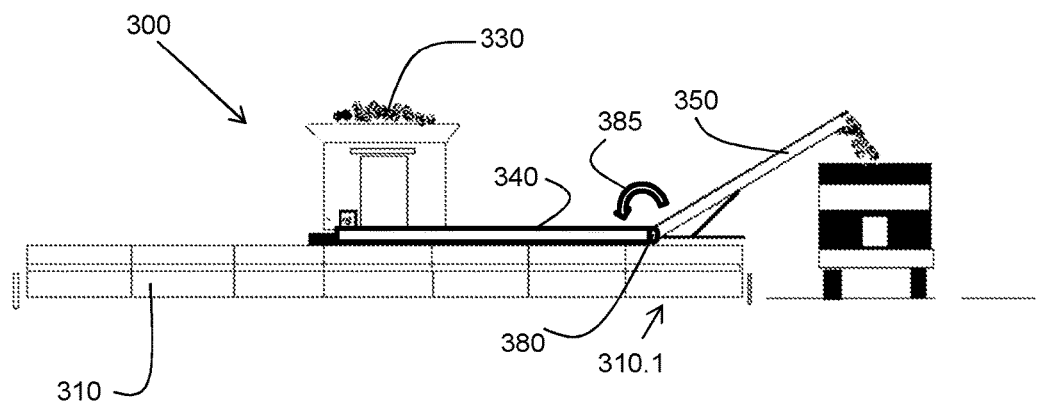
FIG. 3 schematically depicts a front view of an agricultural harvester according to a second embodiment of the present invention.

As an alternative, the discharger can be arranged pivotably about a substantially horizontal axis, as shown in FIG. 3.

FIG. 3 schematically shows a front view of an agricultural harvester 300 according to an embodiment of the present invention, the harvester comprising a header 310, a transporter 340 and a discharger 350, the transporter 340 being arranged to transport the harvested crop 330 as gathered in an on-board tank of the harvester, towards a distal end 310.1 of the header 310.

In the arrangement as shown, the discharger 350 can pivot about a substantially horizontal axis 380 extending in the longitudinal direction, as indicate by the arrow 385.

Note that, as an alternative, the discharger can be adapted to be slid inward or outward in the transverse direction.

As yet another alternative, the discharger may comprise one or more telescopic devices enabling the overall width of the transporter/discharger combination to be reduced, e.g. for transport purposes.

In an embodiment, the transporter and discharger as applied in the agricultural harvester according to the invention, are substantially symmetrical with respect to a central axis of the harvester.

Figure 4A:
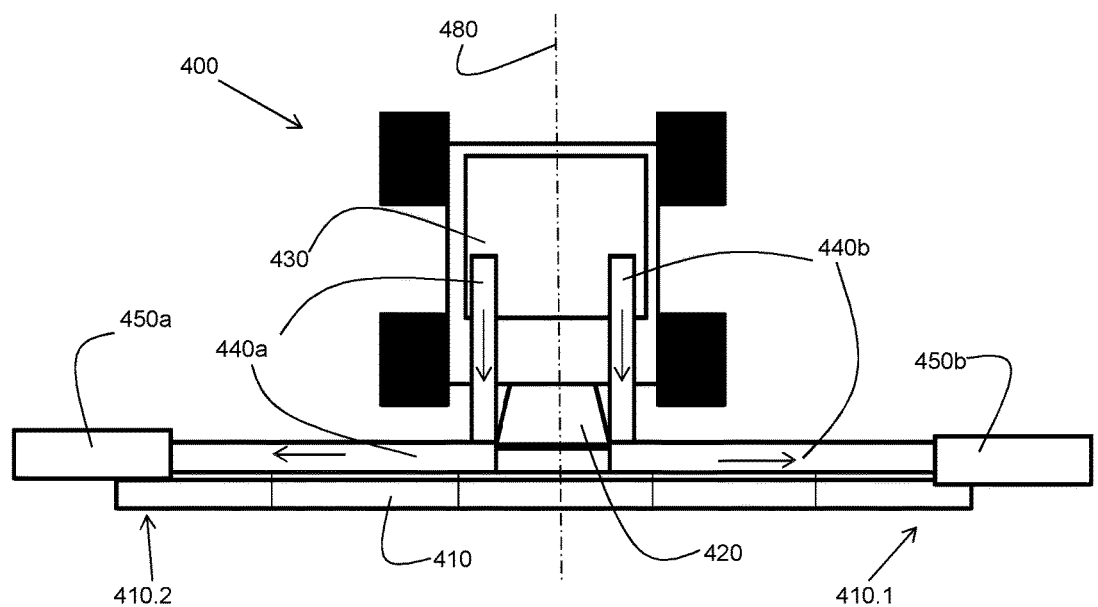
FIGS. 4a and 4b schematically depicts a top view of an agricultural harvester according to a third and fourth embodiment of the present invention.

In FIG. 4a, a top view of such an embodiment is schematically shown.

The agricultural harvester 400 as schematically shown in FIG. 4, comprises a header 410, an on-board tank 430, a transporter, comprising a first transporter 440a and a second transporter 440b, and a discharger comprising a first discharger 450a and a second discharger 450b. By applying such a symmetrical set-up (about the central longitudinal axis 480), a discharging or unloading of the on-board tank 430 can be done from both sides of the harvester since harvested crop is transported towards both distal ends 410.1 and 410.2 of the header 410. In the arrangement as shown, each of the transporter/discharger combinations as shown, i.e. transporter 440a+discharger 450a and transporter 440b+ discharger 450b, may have a similar structure as the transporter/discharger combinations 240 and 340 as described above.

Figure 4B:
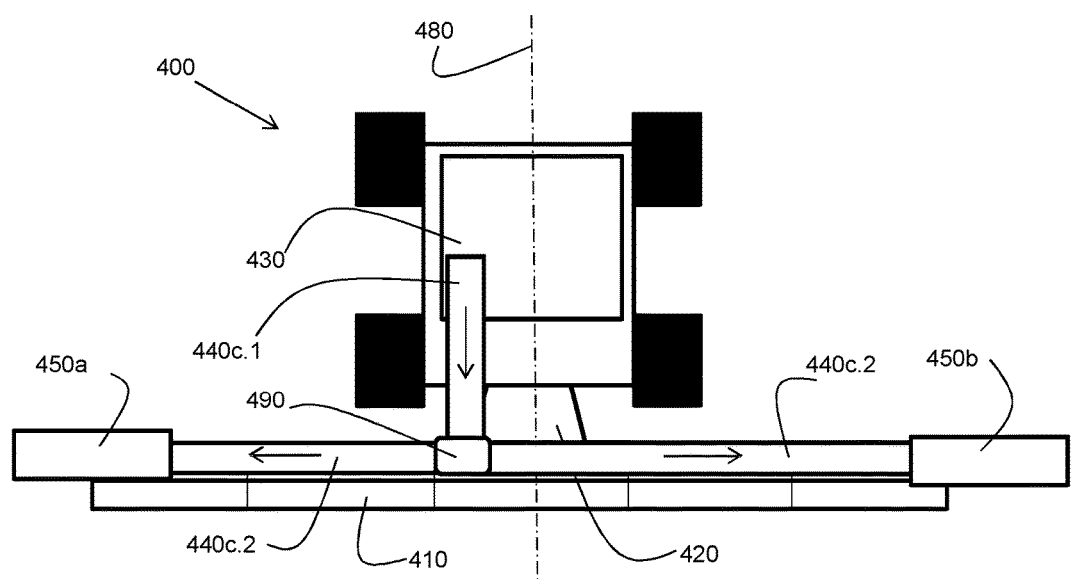

In the arrangement as shown in FIG. 4, each transporter of the transporters 440a and 440b is equipped with a device (such as device 240.1 as shown in FIG. 2) to transport the harvested crop from the on-board tank 430 towards a front of the harvester. Note that, as an alternative, such a transport device can be shared by the transporters. In FIG. 4b, such an arrangement is schematically shown. FIG. 4 schematically shows a top view of an agricultural harvester according to the present invention, comprising a transporter 440c having a first transporter device 440c.1 to transport the harvested crop from the on-board tank 430 towards a front of the harvester and a second transporter device 440c.2 for transporting the harvested crop in the transvers direction, towards both distal ends 410.1 and 410.2 of the header 410. In such an arrangement, the transporter 440c can be provided with a three-way valve 490 for controlling the flow of harvested crop towards one or both of the distal ends.

Figure 5:
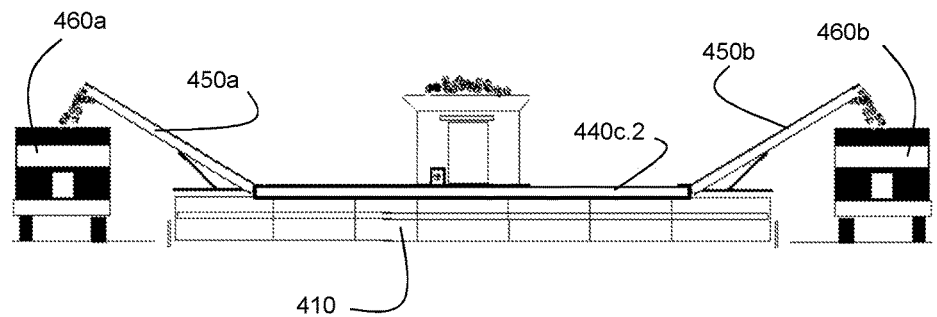
FIG. 5 schematically depicts a front view of the agricultural harvester according to the fourth embodiment of the present invention.

In FIG. 5, a front view of an agricultural harvester as shown in FIG. 4b is schematically shown.

In the front view, the header 410, the second transporter device 440c.2 and the dischargers 450a, 450b are schematically shown.

The dischargers are brought in a slanted position relative to the horizontal plane to bring the harvested crop to an elevated position where it can be discharged into either one of the trucks 460a, 460b.

In an embodiment of the present invention, the displacement of the discharger towards such a slanted position (to discharge the harvested crop) and/or the aforementioned pivoting of the discharger can be realized by providing the agricultural harvester according to the present invention with one or more actuators. In accordance with the present invention, electromagnetic, hydraulic or pneumatic actuators could be applied for such purpose. Preferably, the actuators can be controlled by the operator of the agricultural harvester.

In an embodiment, the transporter of the agricultural harvester according to the present invention further comprises a support structure, which can be applied to support the transport devices and dischargers as described above.

In such embodiment, the transporter can e.g. be arranged in between the header and the front wheels of the agricultural harvester, when viewed in the longitudinal direction. In such arrangement, the transporter, in particular the support structure of the transporter, is thus arranged behind the header.

Figure 6:
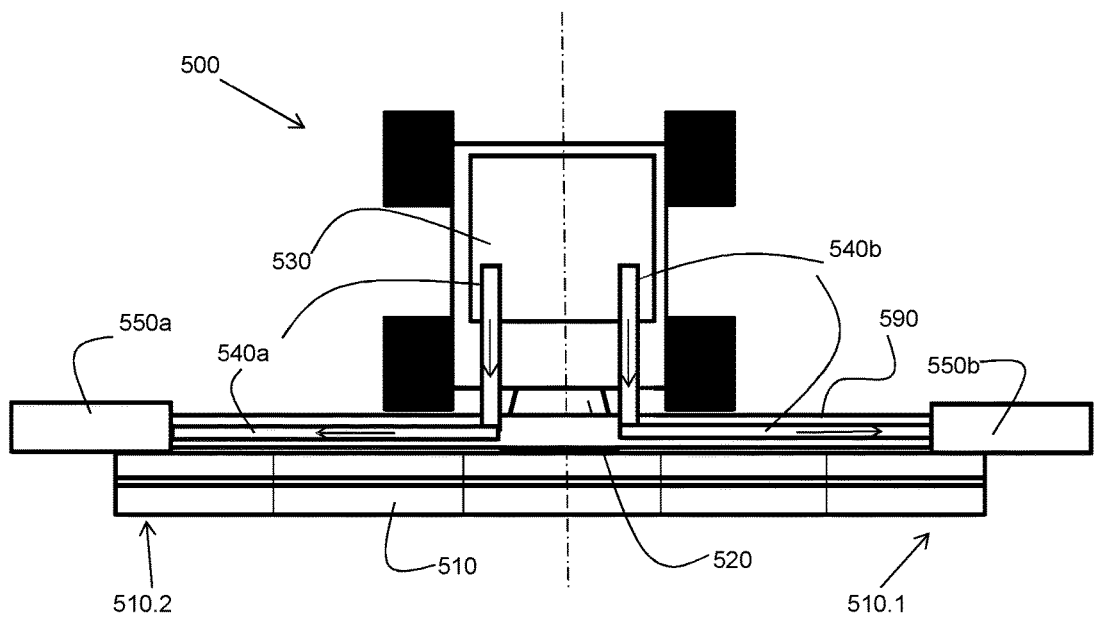
FIG. 6 schematically depicts a top view of an agricultural harvester according to a fifth embodiment of the present invention.

FIG. 6 schematically shows a top view of an agricultural harvester 500, whereby the transporter comprises such a support structure 590. In the embodiment as shown, the transporter comprises, a similar arrangement of transport devices (540a, 540b) for bringing the harvested crop from the on-board container 530 towards the distal ends 510.1 and 510.2 of the conveyer 510. Compared to the embodiment of FIG. 4a, the transport devices (540a, 540b) are mounted to a support structure 590 of the transporter, the support structure being arranged behind the header 510 and extending substantially along the width of the header 510. In the embodiment as shown, the support structure 590 may thus be considered a separate part, separate from the header, such that this structure can be used in combination with different types of headers, as is explained in more detail below. In the arrangement as shown, the support structure 590 is connected to the feeder 520 of the harvester 500. In the arrangement as shown, the dischargers 550a and 550b may also be supported by the support structure 590.

Figure 7:
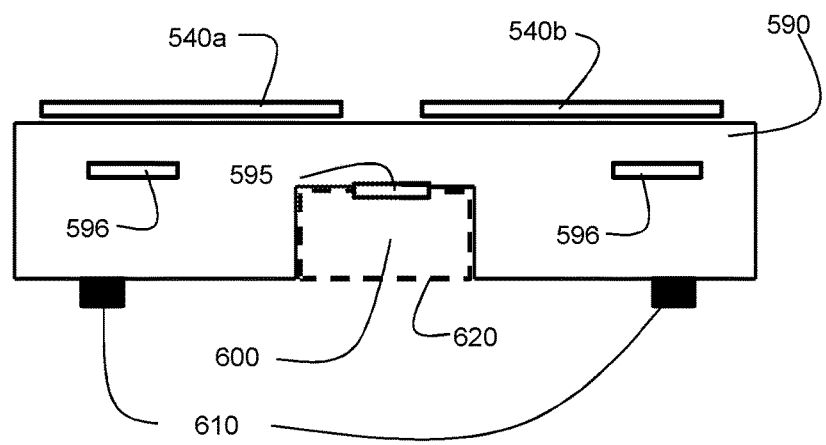
FIG. 7 schematically depicts a front view of a support structure of a transporter as can be applied in an agricultural harvester or unloading structure according to the present invention.

In FIG. 7, a more detailed front view of the support structure 590 is schematically shown. The support structure 590, as e.g. applied in the embodiment shown in FIG. 6, is adapted to support at least part of the transport devices (540a, 540b) as shown in the FIG. 7. Note that the dischargers 550a, 550b of FIG. 6 are not shown. The support structure 590 as shown comprises a recess 600 to receive the feeder of the agricultural harvester. Dotted line 605 schematically represents the outline of the cross-section of the feeder 520 as shown in FIG. 6, in a frontal plane. The support structure 590 as shown further comprises a connector 595 for connecting the support structure to the feeder (not shown) of the agricultural harvester.

In the embodiment as shown in FIG. 7, the support structure is further equipped with wheels 610. In such arrangement, the support structure may e.g. be connected to the feeder using the connector 595 while the header (not shown) can be mounted to the support structure 590, e.g. by means of connectors 596. By doing so, the header need not be provided with header wheels as e.g. shown in FIG. 2, but may be suspended onto or supported by the support structure 590 using the connectors 596.

In such an arrangement, the support structure may also be equipped with a height adjustment mechanism for adjusting the height of the connected header relative to the soil. Such arrangement may further comprise one or more sensors or sensor plates for sensing the height of the header relative to the soil.

In an embodiment, the support structure, in particular the connectors 595 and/or 596 can be adapted to be applied in combination with different types of headers, e.g. grain headers and corn headers. In such arrangement, a grain header can easily be replaced by a corn header or vice versa, without having to remove or replace the transporter/discharger combination.

Figure 8A:
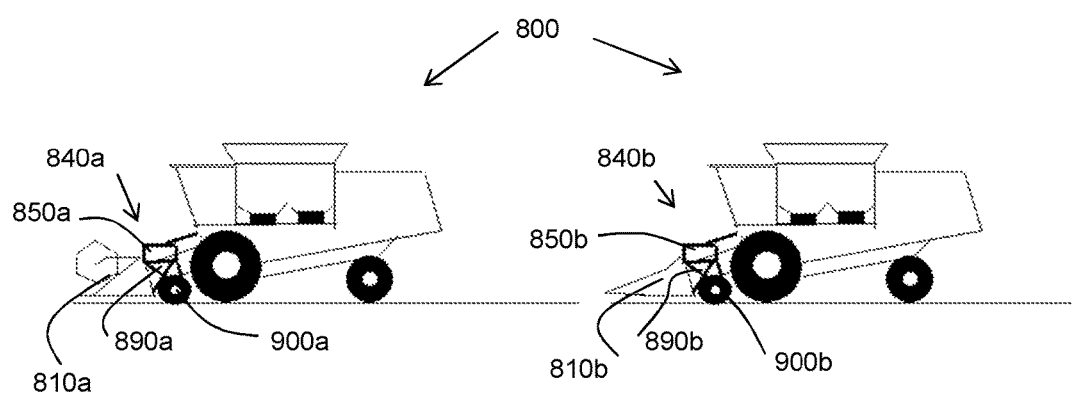
FIGS. 8a and 8b schematically depict side views of agricultural harvesters according to the present invention.

In FIG. 8*a*, two side views of agricultural harvesters according to the present invention are shown, the harvesters 800 comprise a grain header 810*a* and a corn header 810*b* respectively. The harvesters as shown are further equipped with a transporter 840*a* respectively 840*b* as described in FIGS. 6 and 7. The transporters 840*a* respectively 840*b* as shown comprise dischargers 850*a* respectively 850*b* that correspond to the discharger 550*b* of FIG. 6, support structures 890*a* respectively 890 that correspond to support structure 590 of FIGS. 6 and 7, wheels 900*a* respectively 900*b* that correspond to the wheels 610 as shown in FIG. 7.

The use of a transporter as e.g. shown in FIGS. 6-8*a* facilitates the replacement of a header of the agricultural harvester (e.g. from a grain header to a corn header). Because the transporter has a separate support structure, any of the transport devices or the discharger as applied in the present invention need not be mounted to the header, but can be mounted to the support structure of the transporter, thus facilitating the replacement of the header.

Figure 8B:
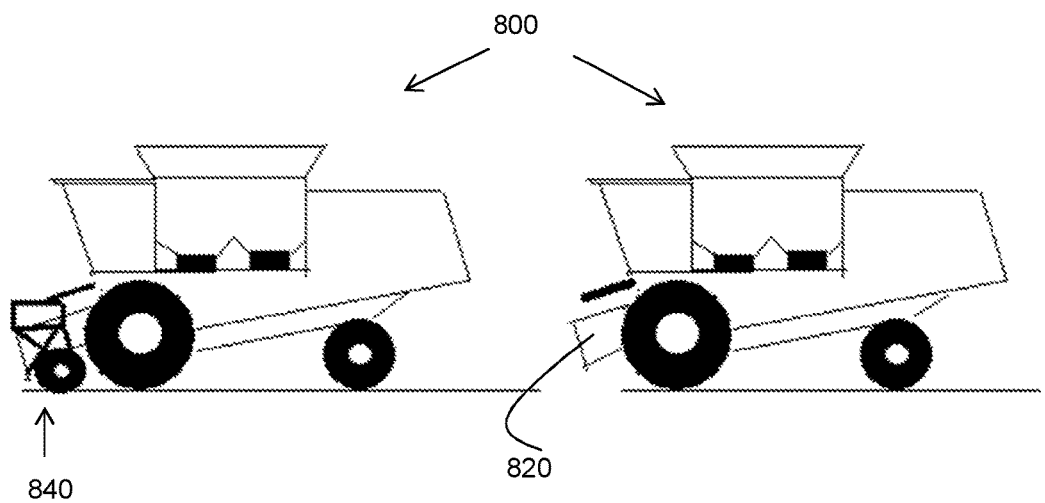

In FIG. 8*b*, two side views are shown of the agricultural harvester 800 are further shown. In the Figure on the left, the header has been removed, the transporter 840 is still attached to the feeder (not shown), while in the Figure on the right, the transporter is also removed, rendering the feeder 820, which e.g. corresponds to the feeder 520 of FIG. 6 visible.

Using a transporter/discharger combination as described in FIGS. 6-8*b* enables to provide an unloading or discharging process having the same advantages as the embodiments as shown in FIGS. 2 to 6; i.e. a less bulky, less heavy and less costly unloading arrangement. In addition, the combination as described in FIGS. 6-8*b* can be implemented while at the same time maintaining a comparatively easy replacement of the header of the harvester.

As such, in an embodiment, the present invention further provides in an unloading system for an agricultural harvester, the system comprising:

a transporter for receiving a harvested crop from an on-board tank of the agricultural harvester, the transporter comprising:
  a support structure having a width substantially matching a width of a header of the agricultural harvester,
  a transport device, mounted to the support structure, for transporting the harvested crop towards a distal end of the support structure;
  a discharger in communication with the transport device of the transporter and adapted to receive the harvested crop as transported by the transport device, at or near the distal end of the support structure, the discharger comprising a discharge outlet for discharging the harvested crop, and wherein the support structure is adapted to be connected to a feeder or header of the agricultural harvester, thereby supporting the header of the agricultural harvester.

In order to transport an agricultural harvester on the road, the header has to be dismounted, and e.g. mounted to a trailer that is pulled by the harvester. In a similar manner, the unloading structure according to the present invention (which can e.g. comprise a transporter 540*b* including a support structure 590 and a discharger 550*b*) can be dismounted and be mounted to a trailer, together with the header.

Figure 9:
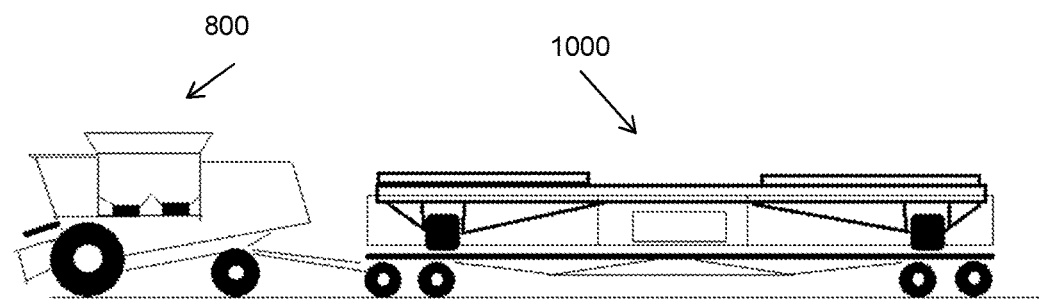
FIG. 9 schematically depicts a side view of an agricultural harvester according to the present invention, including a trailer to which a header and unloading system according to the present invention are mounted.

In FIG. 9, such an arrangement is schematically shown, whereby the header of the agricultural harvester 800 and the unloading structure according to the present invention are dismounted and mounted to a trailer 1000.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly.

The invention claimed is:
1. An agricultural harvester comprising:
  a harvester body for ground movement in a longitudinal direction;
  a header supported by said harvester body and comprising a frame forward of said harvester body and extending in a transverse direction relative to said longitudinal direction towards distal ends and configured for harvesting a crop;
  said harvester body comprising an on-board container for storing the harvested crop;
  a feeder connected to the harvester body and configured for attachment with the frame of the header, the feeder adapted to receive the harvested crop from the header when attached and to transfer the harvested crop in a first direction toward the on-board container,
  a transporter adapted to transport the harvested crop from the on-board container in a second direction and towards at least one said distal end of the header; part of the transporter being mounted to the header and the other part of said transporter mounted to the header and extending along said header to said one distal end and
  a discharger in communication with the transporter and adapted to receive the harvested crop as transported by the transporter, at or near the said distal end of the header, the discharger comprising a discharge outlet for discharging the harvested crop.

2. The agricultural harvester according to claim 1, wherein the transporter comprises a first transport device adapted to transport the harvested crop from the on-board container in said second direction towards the header and a second transport device, adapted to receive the harvested crop from the first transport device and transport the harvested crop substantially transversally towards the discharger.

3. The agricultural harvester according to claim 2 wherein the first transport device comprises an auger or a conveyer belt for transporting the harvested crop in the second direction forwardly from the on-board container towards the front of the harvester.

4. The agricultural harvester according to claim 2, wherein the second transport device comprises an auger or a transverse conveyer belt and is mounted to the header.

5. The agricultural harvester according to claim 2, wherein the transporter further comprises a support structure for supporting the second transport device.

6. The agricultural harvester according to claim 5, wherein the support structure is connected to at least one of the header and the feeder.

7. The agricultural harvester according to claim 5 wherein the support structure is further arranged to support the header.

8. The agricultural harvester according to claim 7, wherein the support structure is provided with a height adjustable mechanism for controlling a vertical position of the header relative to a ground surface.

9. The agricultural harvester according to claim 2 wherein the discharger comprises a discharge tube that is pivotally mounted to the transporter or the header at or near the distal end of the header.

10. The agricultural harvester according to claim 1, wherein the transporter comprises a conveyer belt for transporting the harvested crop towards the distal end of the header.

11. The agricultural harvester according to claim 1, wherein the transporter is adapted to transport the harvested crop from the on-board container towards the distal end of the header in a substantially horizontal plane.

12. The agricultural harvester according to claim 1, wherein the transporter and discharger are substantially symmetrical with respect to a central axis of the harvester.

13. The agricultural harvester according to claim 1, wherein the transporter comprises one or more connectors for providing a releasable connection with at least one of the header and feeder.

14. The agricultural harvester according to claim 13, wherein the one or more connectors are adapted for providing the releasable connection with different types of headers.

15. An unloading system for an agricultural harvester, the system comprising:
a transporter for receiving a harvested crop from an on-board tank of the agricultural harvester, the transporter comprising:
a support structure having a width substantially matching a width of a header of the agricultural harvester defined by distal ends of said header,
a transport device, mounted to the support structure, for transporting the harvested crop along and towards a distal end of the support structure;
a discharger in communication with the transport device of the transporter and adapted to receive the harvested crop as transported by the transport device, at or near the distal end of the support structure, the discharger comprising a discharge outlet for discharging the harvested crop, and
wherein a part of the support structure is structurally connected to a feeder and another part of said support structure to the header of the agricultural harvester, thereby supporting the header of the agricultural harvester
wherein the transport device comprises a conveyer arrangement adapted to transport the harvested crop in a forward direction with respect to an intended direction of travel of the harvester from the on-board tank towards the header and transversely along the header towards the discharger at or near the distal end of the support structure.

* * * * *